(12) United States Patent
Rao

(10) Patent No.: US 8,983,927 B2
(45) Date of Patent: *Mar. 17, 2015

(54) MOBILE SYSTEM FOR REAL-ESTATE EVALUATION REPORTS

(71) Applicant: Bindu Rama Rao, Laguna Niguel, CA (US)

(72) Inventor: Bindu Rama Rao, Laguna Niguel, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/155,339

(22) Filed: Jan. 14, 2014

(65) Prior Publication Data

US 2014/0129456 A1  May 8, 2014

Related U.S. Application Data

(63) Continuation of application No. 12/380,192, filed on Feb. 25, 2009, now Pat. No. 8,630,991.

(51) Int. Cl.
G06F 17/30 (2006.01)
G06Q 10/00 (2012.01)
G06Q 10/10 (2012.01)
G06Q 50/16 (2012.01)

(52) U.S. Cl.
CPC ............... *G06Q 10/00* (2013.01); *G06Q 10/10* (2013.01); *G06Q 50/16* (2013.01)
USPC ........... 707/706; 707/726; 705/313; 705/26.7

(58) Field of Classification Search
CPC .............. G06F 17/30634; G06F 17/30637; G06F 17/30657; G06F 17/30752; G06F 17/30861; G06F 17/30929; G06Q 50/16; H04L 29/08225; Y01S 707/913–707/919; Y01S 707/92; Y01S 707/921; Y01S 707/966; Y01S 707/99933
USPC .......... 707/722, 770, 913–921, 966, E17.014, 707/E17.018, E17.032; 709/203; 705/313

See application file for complete search history.

(56) References Cited

U.S. PATENT DOCUMENTS

| 8,630,991 B2* | 1/2014 | Rao ............................... 707/706 |
| 2002/0046077 A1* | 4/2002 | Mozayeny et al. ............... 705/8 |
| 2004/0192329 A1* | 9/2004 | Barbosa et al. ............ 455/456.1 |
| 2004/0220906 A1* | 11/2004 | Gargi et al. ....................... 707/3 |
| 2008/0306982 A1* | 12/2008 | Moudy ......................... 707/102 |

* cited by examiner

*Primary Examiner* — Cheryl Lewis

(57) ABSTRACT

The present invention provides an elegant means of interaction between real-estate agents who employ mobile devices, wherein the property evaluation information created by any agent is shared with other agents, and wherein such property evaluations created from and collected from a plurality of mobile devices. In particular, property evaluations created by an agent are forwarded to a service provided in accordance with the present invention to communicate with other agents who may also employ mobile devices to review them. The present invention facilitates creation and sharing of an evaluation report that is created by a real-estate agent before a property sale is contracted or agreed to, typically when a property comes to the market for sale.

20 Claims, 4 Drawing Sheets

MOBILE SYSTEM FOR REAL-ESTATE EVALUATION REPORTS

CROSS REFERENCES TO RELATED APPLICATIONS

The present patent application is a continuation of, claims priority to, and makes reference to U.S. non-provisional patent Ser. No. 12/380,192, entitled "MOBILE SYSTEM FOR COLLECTING AND DISTRIBUTING REAL-ESTATE EVALUATION REPORTS", filed on Feb. 25, 2009, issued as U.S. Pat. No. 8,630,991. The complete subject matter of the above-referenced United States Patent Application is hereby incorporated herein by reference, in its entirety.

BACKGROUND

1. Technical Field

The present invention relates generally to a mobile device and particularly to a solution wherein locations of branches of a user's preferred stores/businesses are displayed on a map presented to a user while the user is driving/navigating.

2. Related Art

Mobile devices are becoming ubiquitous. Children carry them and so do adults. Most people working in customer facing industries use mobile phones to stay in touch with their customers and take phone calls throughout the day. Unfortunately, different workflows for such people are barely supported on their mobile phones and thus their mobile phone is not used effectively to support their business needs. In particular, the techniques real estate agents currently use are antiquated and largely ineffective, especially as it relates to the creation and sharing of property evaluation information. A typical scenario involves assigning a property to an agent who makes himself familiar with the property. The agent visits the property, collects facts, and takes notes. Such notes are sometimes referred to as evaluation. Then that agent is assigned a buyer. The agent has at least a working knowledge of a particular area of the market. During an initial consultation, the buyer gives the agent an idea of property he or she would like to buy or rent and a general idea of where that property should be located. Based on this information, the agent searches the Multiple Listing Service (MLS) database to locate properties that are currently available. A second meeting is then set up with the buyer for the purpose of visiting those properties.

Sometimes, a given property has more than one agent assigned to it. Each agent visits the property and collects facts and takes notes. They each maintain their notes and are often incapable of sharing their notes. Thus there is a duplication of effort, and often one agent may have a certain perspective that another agent may not have, and may benefit from. However, with no capabilities to easily and effectively share such evaluations, agents seem to work within the confines of the information they are personally able to collect and process.

Various real-estate companies sometimes assign their own agents to sell or buy a property on sale. In this scenario, several different agents, from one or more real-estate companies, visit the same property, evaluate the property, take notes and try to use it for their sales efforts. They could benefit from sharing their evaluations but there is currently no easy, effective, structured way to share their evaluations. If there are inconsistencies in their evaluations, they are not able to discover such inconsistencies in time and resolve them easily. If there are some issues of ownership known to one agent, it cannot currently be shared in a timely manner with another agent, and quite often, such vital information is unavailable to others interested in that property.

Home buyers and real-estate agents often use paper maps and locate MLS listing entries on the map, and drive around with the maps to visit and evaluate properties that have come to the market. They take down notes in their notebooks and keep their notebooks handy to be able to refer to them. Such methods have proven to be time-consuming, cumbersome, and generally inefficient. In particular, information not currently known to a real-estate agent regarding a problem with the property or its ownership that is known to some other real-estate agent, is not only unavailable, but also likely to remain so.

Another drawback of current techniques relates to the need by a real-estate agent to physically visit properties within the market to evaluate them. Once the agent knows the general area of interest to the buyer, he usually visits the location to evaluate it, before escorting the buyer to each of the properties. Thus, such visits for evaluations delay the sales process, even when some other agent might already have evaluated it previously, due to the lack of mechanisms to share evaluations across agents and for other related reasons.

In view of the foregoing considerations, it is clear that there is a need for an improved system and method for creating and sharing property evaluation information that can be used by real-estate agents in assisting their customer needs.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

The present invention provides an elegant means of interaction between real-estate agents who employ mobile devices, wherein the property evaluation information created by any agent is shared with other agents, and wherein such property evaluations created from and collected from a plurality of mobile devices. In particular, property evaluations created by an agent are forwarded to a service provided by a server, in accordance with the present invention, to communicate with other agents who may also employ mobile devices to review them.

Figure 1:
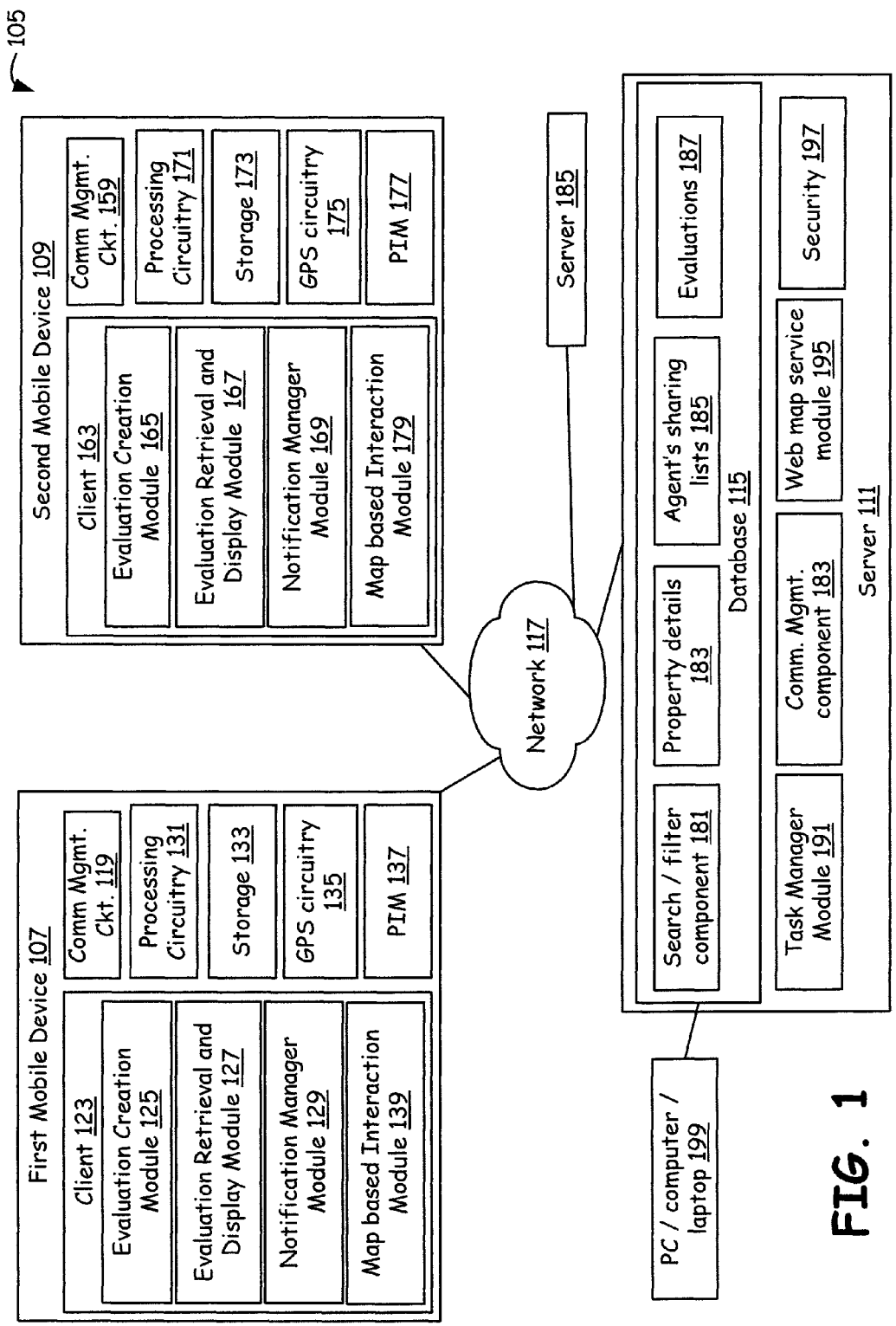
FIG. 1 is a perspective block diagram of a mobile system for collecting and distributing a plurality of real-estate evaluation reports.

FIG. 1 is a perspective block diagram of a mobile system 105 for collecting and distributing a plurality of real-estate evaluation reports. A real-estate property's location and visual appeal are what motivates buyers, and they may believe it appears to be in excellent condition. They sometimes use additional services such as those provided by home inspectors, to evaluate properties and create evaluation reports. Real-estate agents are better able to discover unknown, costly deficiencies that often exist in properties, which the buyer should know about before purchasing the property. The real-estate agents detects most problems, and convey the true condition of the property in the form of an evaluation report, which may include audio portions, photographs, video portions, documents, written reports etc. Unlike typical home inspection reports provided by home inspectors, that are mostly a written document, these evaluation reports created by real-estate agents, in accordance with the present invention, facilitate inclusion of audio inputs, video inputs, textual inputs, photographic inputs, etc. Home inspections are typically conducted after a sales contract or agreement is signed between a buyer and a seller. The present invention facilitates creation and sharing of an evaluation report that is created by a real-estate agent before such a sale is contracted or agreed to, typically when a property first comes to the market for sale, when the real-estate agent is able to review the property and create an evaluation report that is sharable with other real-estate agents or with other users, such as a potential buyer.

The mobile system 105 facilitates collecting and distributing a plurality of real-estate evaluation reports. It comprises a first mobile device 107 that facilitates creation of real-estate evaluation reports, a server 111 that collects real-estate, evaluation reports and facilitates subsequent retrieval, and a second mobile device 109 that retrieves the plurality of real-estate evaluation reports for display to a user, who is typically a real-estate agent. The mobile system 105 manages the collection, storage and retrieval of real-estate evaluation reports and its distribution to users of the first mobile device 107 and the second mobile device 109. In addition, it also facilitates access of evaluation reports by a user from a PC/computer/laptop 199.

The first mobile device 107 comprises a client 123 capable of facilitating creation and display of evaluation reports, a communication management circuitry 119 capable of communicating with the server 111 and the second mobile device 109 employing the network 117, a processing circuitry 131, a storage 133, a GPS circuitry 135 and a personal information manager (PIM) 137. The second mobile device 109 comprises components that are similar to those found in the first mobile device 107.

The server 111 comprises a database 115 that is used to store evaluation reports, property details, agent's search lists etc., a task manager module 191 that is used to execute pre-defined tasks periodically, a communication management component 183 that is used to communicate with the first mobile device 107, the second mobile device 109 and other servers 185, a web map service module 195 that is used to create map displays comprising locations of real-estate properties for sale in a given geographical region, and a security module 197 that is used for authentication, user authorization and for other security related activities.

The mobile system 105 facilitates collecting evaluation reports from one or more real-estate agents and selectively sharing it or and distributing it to other real-estate agents. Multiple agents can review different real estate properties and provide evaluations for those that they care to review or those that interest them. Other agents can retrieve and review these evaluations, enhance them, and update them as necessary. Evaluations can be retrieved from the server 111 using MLS numbers, property addresses, etc. Evaluations can be in the form of textual data, photographs, associated electronic documents, audio feedback provided, etc. They are stored in the evaluations 187 component of the database 115.

Evaluations can expire, can be added to, and can be replaced. Evaluations can be created using evaluation forms provided by the server to the user using the mobile device 107, 109. Such forms can bring up standard set of check boxes, data entry buttons, etc. as needed. For example, the server 111 can provide an appropriate form, of the required kind so that a real-estate agent can create evaluations on his mobile device 107, 109.

In general, the first mobile device 107 is associated with and used by a first real-estate agent and the second mobile device 109 is associated with and used by a second real-estate agent. The first mobile device 107, employed by the first real-estate agent, provides at least one of the plurality of real-estate evaluation reports for sharing with other real-estate agents while the second mobile device 109, employed by the second real-estate agent, retrieves the real-estate evaluation reports for review.

The first mobile device 107 and the second mobile device 109 provide evaluation screens to corresponding users wherein the evaluation screens comprise prompts for soliciting evaluations for one or more real-estate properties. Each of the one or more real-estate properties are identified by a MLS identification, an address, etc. The server receives and stores evaluations provided for the one or more real-estate properties.

The mobile system 105 provides screens or evaluation forms to the first 107 and second mobile device 109 wherein the prompts solicit textual, audio, video and picture inputs that are stored as part of the evaluations provided for the one or more real-estate properties. The prompts are organized into standard forms that a user can respond to. Authorized users can retrieve, review, enhance or replace the evaluations, as necessary.

In general, evaluations can be retrieved using MLS numbers, property addresses, etc. Evaluations can be provided in the form of textual data, photographs, associated electronic documents, audio feedback provided, or a combination thereof, etc. Evaluations can be sent to a group of recipients, who are typically real-estate agents, who receive them for review on their mobile devices 107, 109. The recipients can be part of a social group, and evaluations can be sent to the social group members for review. Every member of the social group receives the evaluations sent for review. It is possible to manage who receives the evaluations. For example, only specific members of a workgroup who are also part of the social group can be assigned rights to review the evaluations.

Evaluations can expire, can be added to, can be replaced. Evaluations can bring up a standard form with text entry fields, buttons, audio recording buttons, video recording buttons, photographic picture collection buttons, and set of check boxes as needed.

Evaluations can also be sent to a social group of real-estate agents and every member of that social group receives the evaluations posted for review. The recipients of the evaluations can be managed. In one related embodiment, only specific members of a social group, who may be colleagues working together, can be assigned rights to review the evaluations. In another related embodiment, only members of a friends list created by a real-estate agent for sharing evaluations are provided rights to review evaluations. In general, when social groups are used to share evaluation, some subset of a social group can be provided rights to review the evaluations.

In one embodiment, a social interaction system offered and managed by the server 185 manages communication between a real-estate agents and a plurality of colleagues who are also real-estate agents. The social interaction system interacts with the agent's sharing list 185 that a real-estate agent can employ to select other users (such as other real-estate agents) to share evaluations with. The sharing of evaluations can be restricted to identified colleagues or friends, based at least in part upon their membership in one or more agent's sharing lists 185 managed by the a real-estate agent who creates his evaluations.

The system 105 comprises a social interaction service employing the server 185 and the server 111 that enable presentation of the plurality of real-estate properties on a map based on their locations. Such a presentation is provided on a map displayed to the real-estate agent on the first 107 and second mobile device 109. The system 105 also comprises a search/filter component 181 that facilitates retrieval and display of evaluations onto mobile devices 107, 109, wherein the criterion for retrieval comprises at least one policy or preference and may, in addition, comprise of user selections of property using their MLS identifications and addresses.

Figure 2:
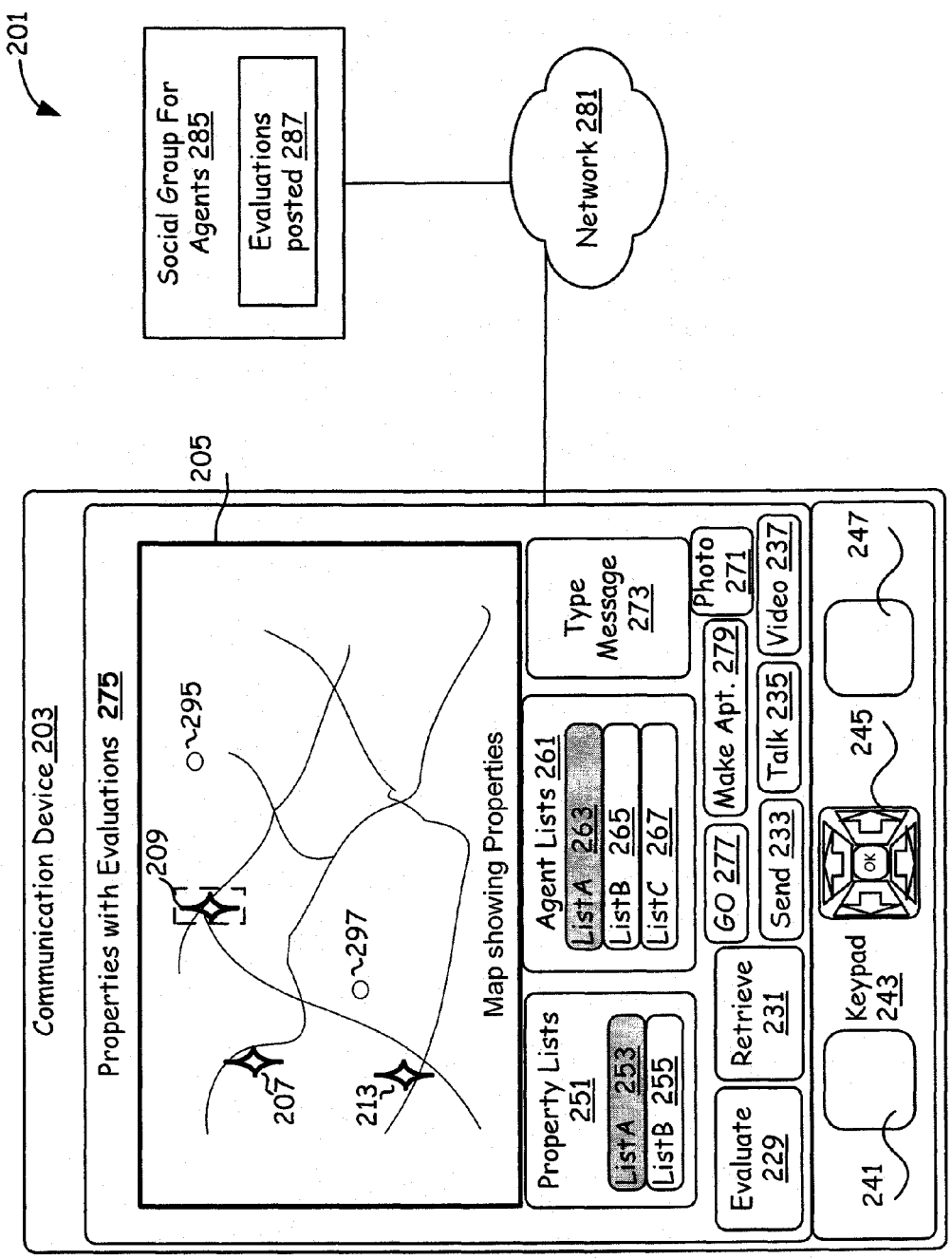
FIG. 2 is system that makes it possible for a user to view a map on a communication device, with real-estate property shown on the map, wherein those properties with evaluations available are highlighted on the map.

FIG. 2 is system 201 that makes it possible for a user to view a map 205 on a communication device 203, with real-estate property 207, 209, 213,295, 297 shown on the map, wherein those properties 209 with evaluations available are highlighted on the map. The system 201 supports a novel method of displaying property evaluation information to real-estate agents wherein the real-estate property is located in a geographical area of interest. The system 201 generates and displays a digital map for viewing by real-estate agents on their communication device 203, such as the mobile computing devices that agents often carry. It enables the agents to view a map with highlighted properties, focusing on a geographical area of interest.

An agent can obtain property evaluation information for real-estate property for the geographical area of interest, wherein said property evaluation information is obtained from a remote database communicatively coupled to the agent's mobile computing device 203. The property evaluation information includes at least a location information, comparative market price information, property defects information, problems fixed information, ownership information, quality of life information, school district profile information, number of days in the market information, legal status information and a market status of the item of the real-estate property.

The communication device 203 comprises a "properties with evaluation" 275 screen that displays the map 205 with properties with evaluations 209 highlighted on the map 205. The map 205 shows real-estate properties, and when a user selects (by clicking on the displayed property on the map 205) one of the properties, its property details are displayed in the screen 275. If the selected property is highlighted indicating availability of an evaluation (previously created by the user or a different user), the appropriate evaluation is retrieved and displayed, along with the property details. A property lists 251 lists available property. An agent list 261 provides lists of agents that a user can employ to share a newly created evaluation. A Go 277 button activates navigation on the communication device 203, such as navigation to the selected property on the currently displayed map 205. A make appointment 279 button facilitates making an appointment to show a selected property to a potential buyer, etc.

A social group for agents 285 communicatively coupled to the communication device 203 makes it possible for a user (such as a real-estate agent) to post new evaluations created on the communication device 203 with members of a social group of real-estate agents. Evaluations posted 287 by one or more users are shared with the entire social group of real-estate agents.

The evaluate 229 button activates the creation of a new evaluation. A user can employ the type message 273 data entry region to type in (using a keyboard, a soft key board or a pen interface) to enter text messages while creating a new evaluation. A talk button 235 activates recording of audio inputs provided by the user. When activated a second time, it stops recording. A video button 237 activates video recording and stores videos created locally until it is transferred to a database as part of an evaluation form. Similarly, a photo button 271 activates taking a photographic image and storing it locally until it is transferred to a database as part of an evaluation form.

In one embodiment, the user views a map 205 on the mobile device 203 displaying a property indicator on the digital map at the location of an item of property in the real-estate market. The property indicator (which is an icon, image, logo, etc.) 207, 209, 295, 213, 297 is associated with the item of property in the real-estate market, and is displayed at geographical coordinates associated with its location/address. In particular some of the property indicators are highlighted 209 (by a change of color, by a colored border, etc.) to draw attention to those that have an evaluation currently available, in response to the property indicator being selected, the property evaluation information of the item of properly associated with the selected property indicator is retrieved and displayed. After an evaluation is displayed for a property, the user, typically a real-estate agent, can provide additional audio inputs, video inputs, comments in textual form, etc. Thus, a database 115 used to store evaluations can collect additional property evaluation information provided by a real-estate agent from the mobile computing device 203 of that agent. The database 115 associates the collected additional property evaluation information with the item of property associated with the selected property indicator while storing it in the database 115.

The real-estate properties that are available in a geographical region are highlighted in a map displayed on the mobile device of the real estate agents. The present invention makes it possible to show a plurality of points within the selectable map, each point of the plurality of points representing the appropriate geographic location of an available real estate property that comprises a corresponding evaluation. The present invention facilitates presenting the collected evaluations to the one or more real estate agents via a social network group 285 to which each of the one or more real estate agents can gain access using their associated one or more of the mobile devices. To facilitate creation of evaluations, in one embodiment the user is presented with an appropriate form, from a set of available forms, for input solicitation, based upon a type associated with each of the available real estate properties and the preferences of the corresponding one or more real estate agents. Also, the evaluations are associated with additional information regarding the features of the available real estate properties and these can be retrieved together by a real estate agent from their mobile devices.

Figure 3:
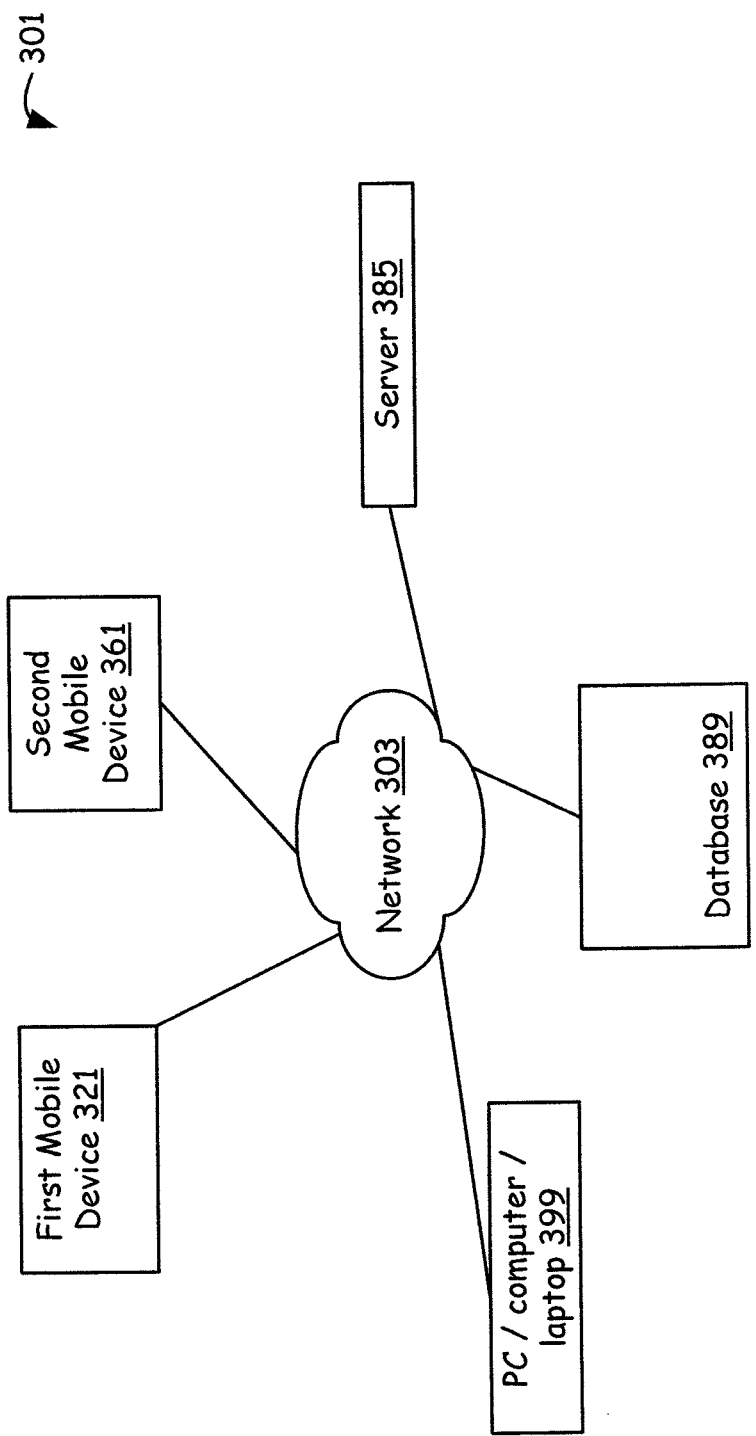
FIG. 3 is a system for gathering evaluations of real-estate properties, the system comprising a database of real-estate information comprising details of a plurality of real-estate properties, and a plurality of devices.

FIG. 3 is a system 301 for gathering evaluations of real-estate properties, the system 301 comprising a database 389 of real-estate information comprising details of a plurality of real-estate properties, and a plurality of devices 321, 361, 399. The database 189 is communicatively coupled to the plurality of devices that each facilitate creation of evaluation reports by users, who are primarily real-estate agents and their customers (buyers and sellers of properties). Each of the plurality of devices 321, 361, 399 is capable of presenting forms to the users for creation of the evaluation reports. Each of the plurality of devices 321, 361, 399 is capable of communicating evaluation reports created, to the database 389. The database 389 is capable of facilitating selective retrieval of the evaluations from the plurality of devices 321, 361, 399.

In one embodiment, the system 301 also comprises a server 385 communicatively coupled to the database 189 and to the plurality of devices 321, 361, 399. The server 385 presents evaluation forms to the plurality of devices 321, 361, 399 soliciting inputs from their users. The server 385 receives evaluation reports from the plurality of devices 321, 361, 399 in response to the evaluation forms and stores them in the database 389.

In general, at least one of the plurality of devices 321, 361, 399 is a mobile phone, others are PCs, laptops, computers etc. The forms provided by the server 385 include selective prompts for textual, audio, video and photographic inputs. In one related embodiment, the forms comprise selective prompts for textual, audio, video and photographic inputs and the evaluation reports comprise at least one of audio inputs, video inputs and photographic inputs.

In one embodiment, the plurality of devices 321, 361, 399 each comprise a GPS receiver circuitry. Each of the plurality of devices 321, 361, 399 read a geographic location information employing the GPS receiver circuitry and communicate it to the database 389 along with the evaluation reports created.

Figure 4:
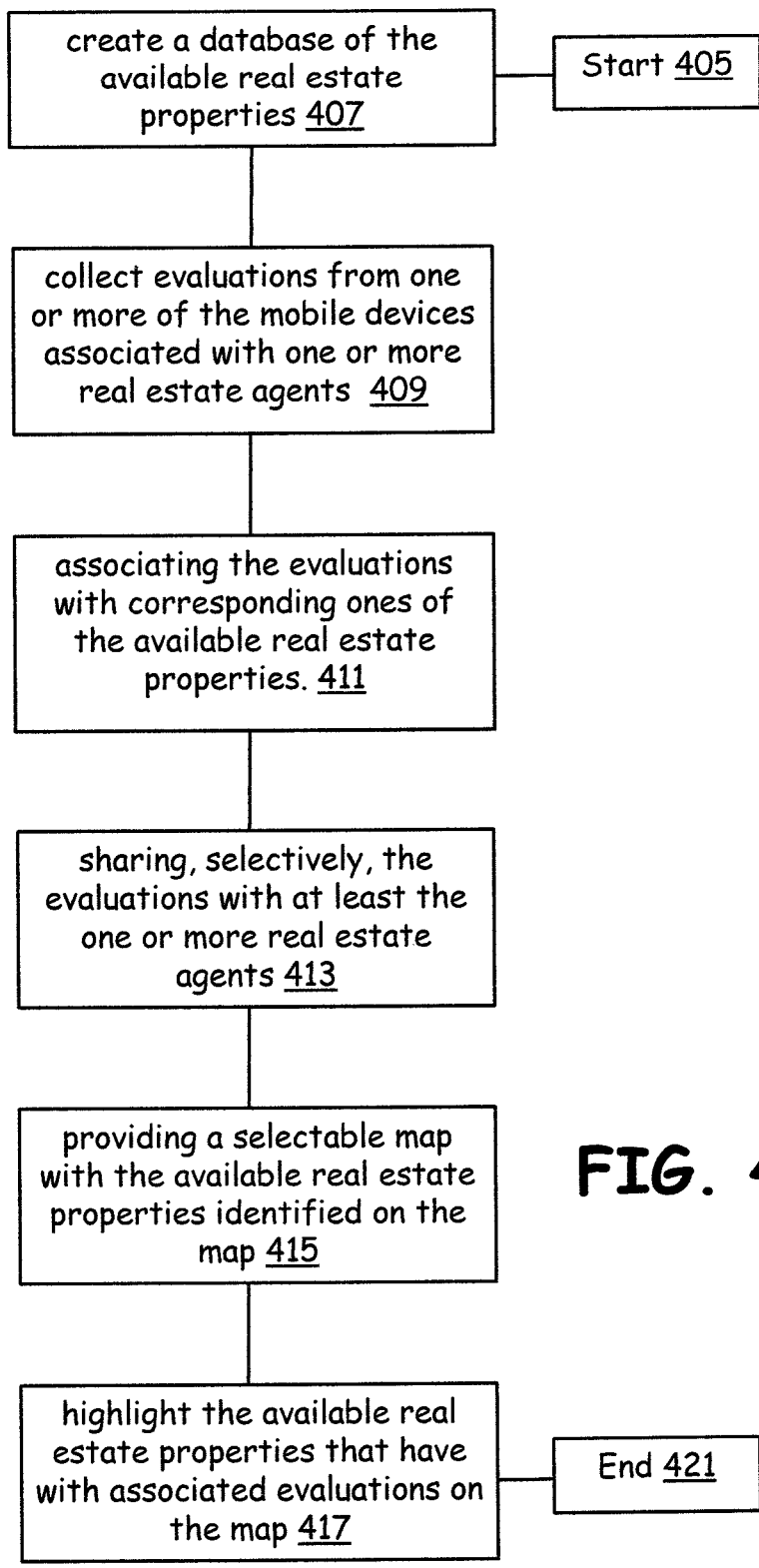
FIG. 4 is a work flow diagram of an exemplary operation of the mobile system for collecting and distributing a plurality of real-estate evaluation reports.

FIG. 4 is a work flow diagram of an exemplary operation of the mobile system 105 for collecting and distributing a plurality of real-estate evaluation reports. The exemplary operation provides a method of evaluating available real estate, properties and creating evaluation reports for sharing it with others. Processing starts at a start block 405 when the real-estate agent creates an account, makes a list of friends/agents to share evaluations with and determines properties of interest and one or more geographical regions of interest. At a next block 407, the method comprises the steps of creating a database of the available real estate properties. At a next block 409, the method addresses collecting evaluations from one or more of the mobile devices associated with one or more real estate agents. Then, at a next block the evaluations are associated with corresponding ones of the available real estate properties.

At a next block 413, the operation comprises sharing, selectively, the evaluations with at least the one or more real estate agents and displaying the evaluations when retrieved from the mobile devices. At a next block 415, it facilitates providing a selectable map with the available real estate properties identified on the map. The map is presented to the user and is used by the user for navigating to one or more properties, as needed. Then, at a next block 417, those of the available real estate properties with associated evaluations are highlighted on the map presented to the user. When a user selects one of the available real estate properties with associated evaluations that are highlighted on the selectable map, the appropriate one of the evaluations available are presented to the user, optionally with other known details of the property. Processing finally terminates at a next block 421.

In one embodiment, the method also includes the further step of verifying the authorization of a user to view the displayed evaluations when the evaluations are retrieved from the mobile devices. User authorizations ensure that only authorized real-estate agents can create evaluations, and share it with other authorized individuals, such as other real-estate agents. In addition, verifying the authorization of the one or more real estate agents before they are allowed to retrieve the evaluations that are available also ensures security of data.

Some prior art solutions allow a first user about to navigate using a map to a particular address, or to a historical landmark, famous restaurant, etc. However, these navigational devices, or related systems, do not help in creating property evaluations that can be stored and later shared with a user of a second device. Thus, the present invention provides features useful for the creation of property evaluations that are communicated from the first user's mobile device to a database for subsequent sharing with the second user's mobile device.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

Although the present invention has been described in terms of GPS coordinates/and navigational information communication involving mobile phones and computers, it must be clear that the present invention also applies to other types of devices including mobile devices, laptops with a browser, a hand held device such as a PDA, a television, a set-top-box, a media center at home, robots, robotic devices, vehicles capable of navigation, and a computer communicatively coupled to the network.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A client component in a first mobile device, in a mobile system that collects and distributes information, the mobile system comprising a plurality of mobile devices, the first mobile device comprising at least one non-volatile memory having stored therein one or both of firmware and software, communication circuitry and at least one processor, the client component comprising:
the client component configured to facilitate creation, by a user, of real estate evaluation reports;
the client component configured to provide a selectable map of a region with each available real estate property in the region identified on the map with property indicators, wherein the property indicators are one of an icon, image and logo;
the client component configured to highlight on the selectable map the property indicators of those of the available real estate properties that have at least one associated real estate evaluation report, by means of a change of color, or a colored border displayed on the corresponding property indicator; and
the client component configured to retrieve and display a first real estate evaluation report associated with a user selected one of the highlighted property indicators displayed on the selectable map.

2. The client component of claim 1 further comprising:
the client component configured to provide an authorized user the ability to create real estate evaluation reports and share it with other authorized individuals; and
the client component configured to verify the authorization of the user before allowing the user to retrieve the real estate evaluation reports that are available.

3. The client component of claim 1 further comprising a search component that employs a criterion for search and retrieval comprising at least one policy or preference and user selections of multiple listing service (MLS) identifications or addresses.

4. The client component of claim 1 further comprising:
the client component configured to present to the user of the first mobile device an appropriate form for creating a new real estate evaluation report from a set of available forms, wherein the appropriate form is provided to solicit user input, and is selected based upon a property type associated with a corresponding real estate property and preferences of the user.

5. The client component of claim 1 wherein the client component further comprises:
the client component configured to present to the user an appropriate form for the creation of a new real estate evaluation report, wherein the new real estate evaluation report is associated with a corresponding real estate property selected by the user on the selectable map;
the client component configured to receive user responses to the appropriate form, wherein the appropriate form comprises prompts for textual, audio, video and photographic inputs; and
the client component configured to assemble the received user responses into the corresponding real estate evaluation report.

6. The client component of claim 1 wherein sharing of a newly created real estate evaluation report occurs via interactions with the server, via the selectable map displayed by the client component, and via social group interactions within a social group facilitated by the client component and the server; and
the client component configured to support interactions within the social group, the client component making it possible for a user to share the newly created real estate evaluation report with members of the social group or with a subset thereof.

7. The client component of claim 1 further comprising:
the client component, based on user input, configured to make an appointment for the user to visit a selected one of the available real estate properties.

8. The client component of claim 1 further comprising:
the client component navigating to a selected one of the available real estate properties on the currently displayed selectable map.

9. The client component of claim 1 further comprising:
the client component configured to gather an additional evaluation report from the user for a property associated with an existing real estate evaluation report, wherein the existing real estate evaluation report is created by another user and shared by the another user; and
the client component configured to gather and share the additional evaluation report.

10. A server communicatively coupled to a plurality of devices in a communication network, the server comprising at least one storage having stored therein one or both of firmware and software and at least one processor operably coupled to the at least one storage, the server further comprising:
the server configured to support collective creation of a plurality of real estate evaluation reports by a plurality of users;
the server configured to facilitate the selective sharing of the plurality of real estate evaluation reports in a social group managed by the server;
the server configured to provide, for display and user interaction, a selectable map for a geographical region with all available real estate properties identified on the selectable map based on the geographical region and a search criteria, wherein those of the available real estate properties that have associated evaluation reports are highlighted on the selectable map by means of a change of color, or a colored border assigned to an associated indicator icon, image or logo displayed on the selectable map; and
the server configured to retrieve and present a first real estate evaluation report associated with a user selected one of the highlighted property indicators displayed on the selectable map.

11. The server of claim 10 further comprising:
a search component that receives a criterion for search and retrieval comprising at least one policy or preference and user selections of multiple listing service (MLS) identifications or addresses.

12. The server of claim 10 further comprising:
the server, based on user input received from one of the plurality of devices, configured to make an appointment for the user to visit a user selected one of the available real estate properties.

13. The server of claim 10 further comprising:
the server configured to gather and share real estate evaluation reports received for one or more properties in a geographical region; and
the server presenting appropriate ones of the real estate evaluation reports when corresponding properties are selected by a user from a selectable map presented to the user on one of the plurality of devices.

14. The server of claim 10 further comprising:

the server configured to verify the authorization of a user before allowing the user to retrieve the real estate evaluation reports that are available; and the server configured to provide an authorized user the ability to create real estate evaluation reports and share it with other authorized individuals.

15. A mobile device with a GPS circuitry, comprising at least one non-volatile memory having stored therein one or both of firmware and software, communication circuitry and at least one processor, the mobile device further comprising:

a client component configured to provide a selectable map of a region with available real estate properties identified on the selectable map with property indicators, wherein the property indicators are each one of an icon, image and logo;

the client component configured to highlight on the selectable map the property indicators of those of the available real estate properties that have at least one associated real estate evaluation report, by means of a change of color, or a colored border displayed on the corresponding property indicator; and the client component retrieving and displaying the at least one associated real estate evaluation report for one of the highlighted property indicators upon its selection by a user.

16. The mobile device of claim 15 wherein the client component retrieves and displays real estate evaluation reports and facilitates creation of real estate evaluation reports for sharing with others.

17. The mobile device of claim 15 wherein the client component authenticates the user and verifies the user's authorization before retrieving and displaying real estate evaluation reports and before facilitating creation of real estate evaluation reports for sharing with others.

18. The mobile device of claim 15 wherein the client component retrieves and displays real estate evaluation reports for a property and allows the user to provide additional audio inputs, video inputs and comments.

19. The mobile device of claim 15 wherein the client component is configured to forward a new real estate property evaluation report created by a user to other users for review and feedback.

20. The mobile device of claim 15 wherein the client component presents to a user on the selectable map real estate properties of interest to the user from one or more geographical regions of interest.

* * * * *